United States Patent [19]

Hopkinson

[11] 3,924,138

[45] Dec. 2, 1975

[54] PULSED POWER SUPPLY SYSTEM FOR NEUTRON WELL LOGGING

[75] Inventor: Eric C. Hopkinson, Houston, Tex.

[73] Assignee: Dresser Industries, Inc., Dallas, Tex.

[22] Filed: June 30, 1972

[21] Appl. No.: 267,780

Related U.S. Application Data

[63] Continuation-in-part of Ser. No. 166,791, July 28, 1971, Pat. No. 3,714,468.

[52] U.S. Cl. .................. 250/502; 315/111; 328/233
[51] Int. Cl.² ....................... G21G 4/02; H05H 5/00
[58] Field of Search .................. 307/252 J; 328/233; 250/84.5, 83.6 P, 41.9 SA, 41.9 SE, 502; 315/111

[56] References Cited
UNITED STATES PATENTS
2,992,333  7/1961  Gale................................... 250/84.5

*Primary Examiner*—John Zazworsky
*Attorney, Agent, or Firm*—William E. Johnson, Jr.

[57] ABSTRACT

A variable D. C. power supply and a variable A. C. power supply are coupled onto the upper end of a single conductor cable at the earth's surface and from the lower end of said cable to a well logging instrument. The A. C. voltage is used to provide filament power for the ion source accelerator tube. The D. C. voltage is used to provide power to fixed D. C. loads maintained constant by regulators once a threshold is reached. The D. C. voltage is raised above the threshold to control the pulsed acceleration voltage and hence neutron output by first feeding into a unijunction relaxation oscillator in combination with an SCR output which output is transformer coupled into a voltage multiplier circuit. An antilatch feature is provided for the SCR by transformer coupling the pulses on the SCR anode back to the base of a transistor in series with the cathode of the SCR. Two outputs of the voltage multiplier circuit are connected to the cathode and anode, respectively, of an ion source accelerator tube, the cathode being connected through a resistor to retard the ripple pulsing of the cathode to allow ionization of the accelerator tube.

9 Claims, 5 Drawing Figures

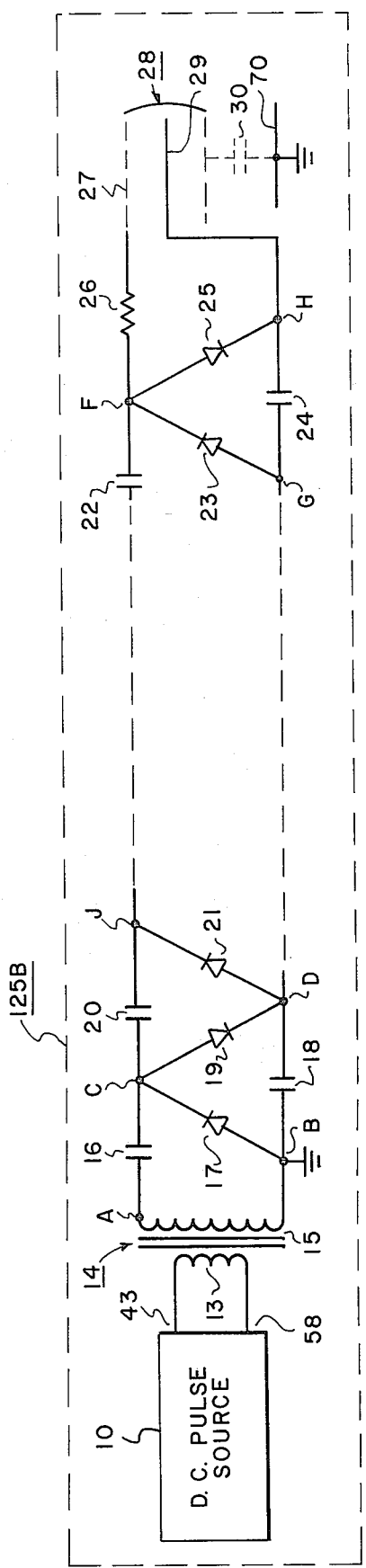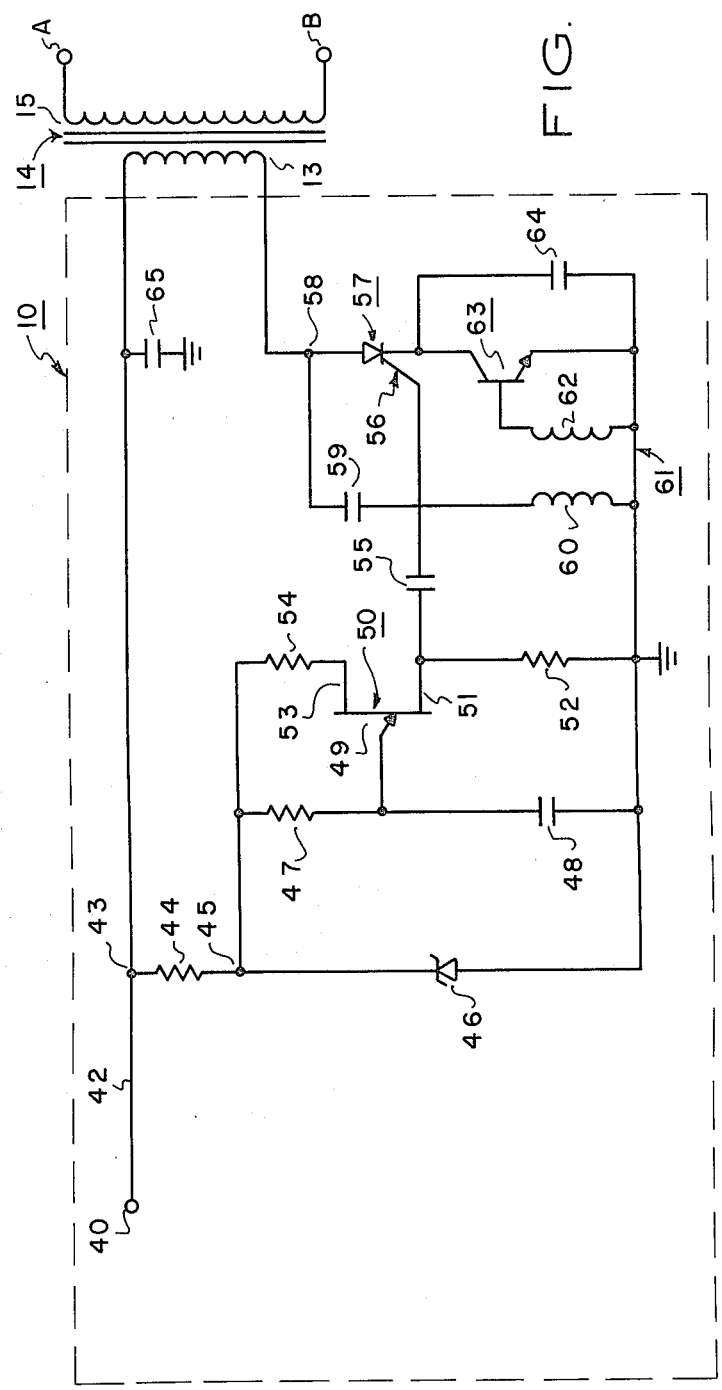
FIG. 3
FIG. 4

PULSED POWER SUPPLY SYSTEM FOR NEUTRON WELL LOGGING

RELATED APPLICATION

This application is a continuation, at least in part, of my U.S. Patent Application Ser. No. 166,791, for PULSED POWER SUPPLY SYSTEM, filed July 28, 1971, now U.S. Pat. No. 3,714,468.

BACKGROUND OF THE INVENTION

This invention relates to pulsed neutron well logging in general, and in particular, to a well logging system using a single conductor cable and a voltage multiplier circuit having a ripple parameter matched to a given characteristic of an ion source accelerator tube useful in pulsed neutron well logging.

Pulsed neutron well logging is well known in the art, for example, as illustrated and described in U.S. Pat. Nos. 3,379,882 and 3,379,884 to Arthur H. Youmans, each of which is assigned to the assignee of the present invention. In such prior art systems, the formations surrounding the borehole are irradiated with neutrons from a periodically varying source at some given frequency, for example 1,000 pulses per second. A detecting system is synchronized with the source to operate in most cases while the source is off. The radiation detected may be either thermal neutrons or gamma rays which result from thermal neutron capture; in either event, the signal is related to the population and to the decline of the population of thermal neutrons within the formations. From the time the neutron source is turned off, the thermal neutrons are gradually captured and detection per unit time decreases until the source is again turned on. By measuring the number of thermal neutrons present at any particular time, the rate of decay of the thermal neutron population is measured.

Such prior art pulsed neutron well logging systems commonly use so-called "artificial" sources of radiation because they may be turned off when not in use, and because they provide relatively monoenergetic radiation of a particular character. Typical of these artificial sources in the static atmosphere ion accelerator tube described in U.S. Pat. No. 2,689,918 to Arthur H. Youmans and U.S. Pat. No. 3,309,522, also to Arthur H. Youmans, each of which is assigned to the assignee of the present invention, and each of which is designed to provide a substantial output of high energy neutrons by means of the well known "D-T reaction." With such prior art pulsed neutron generators, it has been common practice to power the accelerator tubes by a belt-driven, electrostatic generator, such as the well known Van de Graaff high voltage generator.

While such prior art pulsed neutron well logging systems using the inventions of the aforementioned patents have achieved a substantial commercial success, they are more easily adaptable to the logging of boreholes having relatively large tubing therein, for example, tubing which is larger than two inches in its inside diameter. This has generally been the case because of the practical difficulties associated with fabricating an instrument small enough to pass through two inch tubing having the necessary instrumentation therein and also because multi-conductor cable can be more readily used within the larger tubing. Conversely, it is highly desirable to use a single conductor cable within the smaller tubing.

It is therefore the primary object of the present invention to provide a new and improved pulsed neutron well logging system which can be used in conjunction with a single conductor cable;

It is also an object of the invention to provide a new and improved pulsed neutron well logging system which is easily fabricated within a well logging instrument having the capability of passing through two inch tubing;

It is yet another object of the present invention to provide a new and improved circuit for pulsing a neutron accelerator tube;

It is still another object of the present invention to provide new and improved circuitry for matching a ripple parameter of a voltage multiplier circuit to a given characteristic of an ion source accelerator tube;

it is still another object of the invention to provide a new and improved high voltage source for use with an ion source accelerator tube.

SUMMARY OF THE INVENTION

The objects of the invention are accomplished, generally, by the provision of a voltage multiplier circuit having a ripple parameter matched with a given characteristic of an ion source accelerator tube for producing fast neutrons. As an additional feature, the well logging instrument is used with a single conductor cable whereby the power supply voltages are transmitted down the cable to the instrument and the signals from the instrument are transmitted up the cable.

These and other objects, features and advantages of the present invention will be more readily understood from a reading of the following detailed specification and drawing, in which:

FIG. 3 is a schematic illustration of a voltage multiplier circuit connected to an ion source accelerator tube in accordance with the present invention;

FIG. 4 is a schematic illustration showing in greater detail the D.C. pulse source shown in block diagram in FIG. 3.

Figure 1:
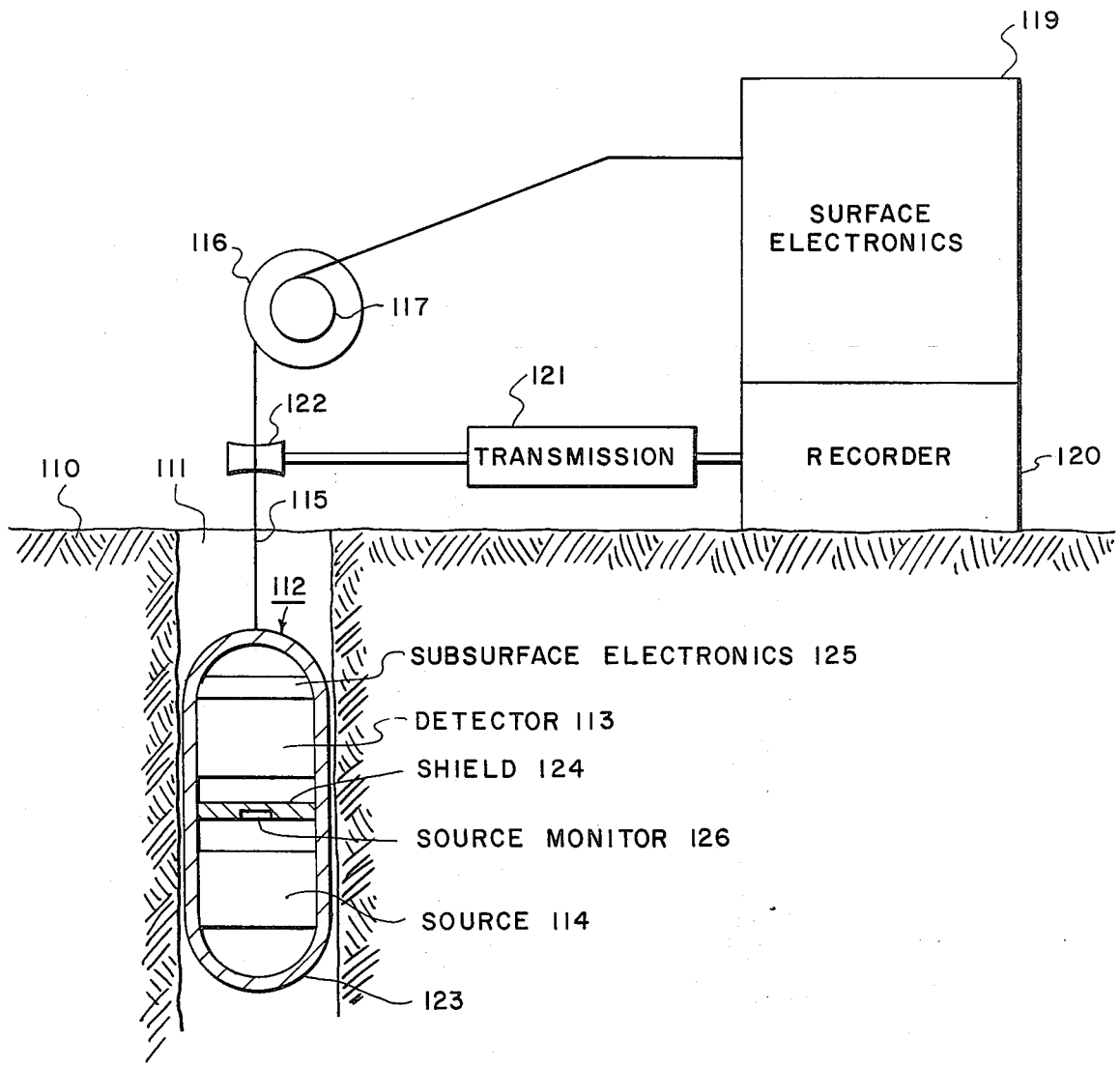
FIG. 1 is a diagrammatic illustration in elevation, partly in cross section, of a well logging instrument according to the present invention in its operative position.

Referring to the drawings in detail, particularly FIG. 1, there is illustrated schematically a radioactivity well surveying operation in which a portion of the earth 110 is shown in vertical section. A well 111 penetrates the earth's surface and may or may not be cased. Disposed within the well is subsurface instrument 112 of the well logging system. Subsurface instrument 112 comprises a detecting system 113 and a neutron source 114. Cable 115 suspends the instrument in the well and contains a single conductor for electrically connecting the instrument with the surface apparatus and electronics. The cable 115 is wound on or unwound from drum 116 in raising and lowering the instrument 112 to traverse the well.

In making a radioactivity log of a well, instrument 112 is caused to traverse the well, thereby causing pulsed neutrons from source 114 to irradiate the formations surrounding the borehole and radiations influenced by the formations are detected by detecting system 113. The resultant signal is sent to the surface through cable 115. Through the slip ring 117 on the end of the drum, the signal is conducted to the surface electronics 119, where such signals are processed and then recorded on the recorder 120 as explained in more detail hereinafter. Recorder 120 is driven through a transmission 121 by measuring reel 122 over which cable 115 is drawn so that recorder 120 moves in correlation with depth as instrument 112 traverses the well. It is to be understood that the instrument housing 123 is constructed to withstand the pressures and mechanical and thermal abuses encountered in logging a deep well and provide adequate space within it to house the necessary apparatus and permit the transmission of radiation through it.

It is desirable to interpose between the neutron source 114 and detector 113 a neutron absorbing shield 124 which may be, for example, tungsten, copper or a hydrogenous material such as paraffin or a combination of such materials. A neutron source monitor 126, for example, a Geiger-Muller counter responsive to gamma rays resulting from fast neutrons from the source 114, is fabricated within the shield 124.

Figure 2:
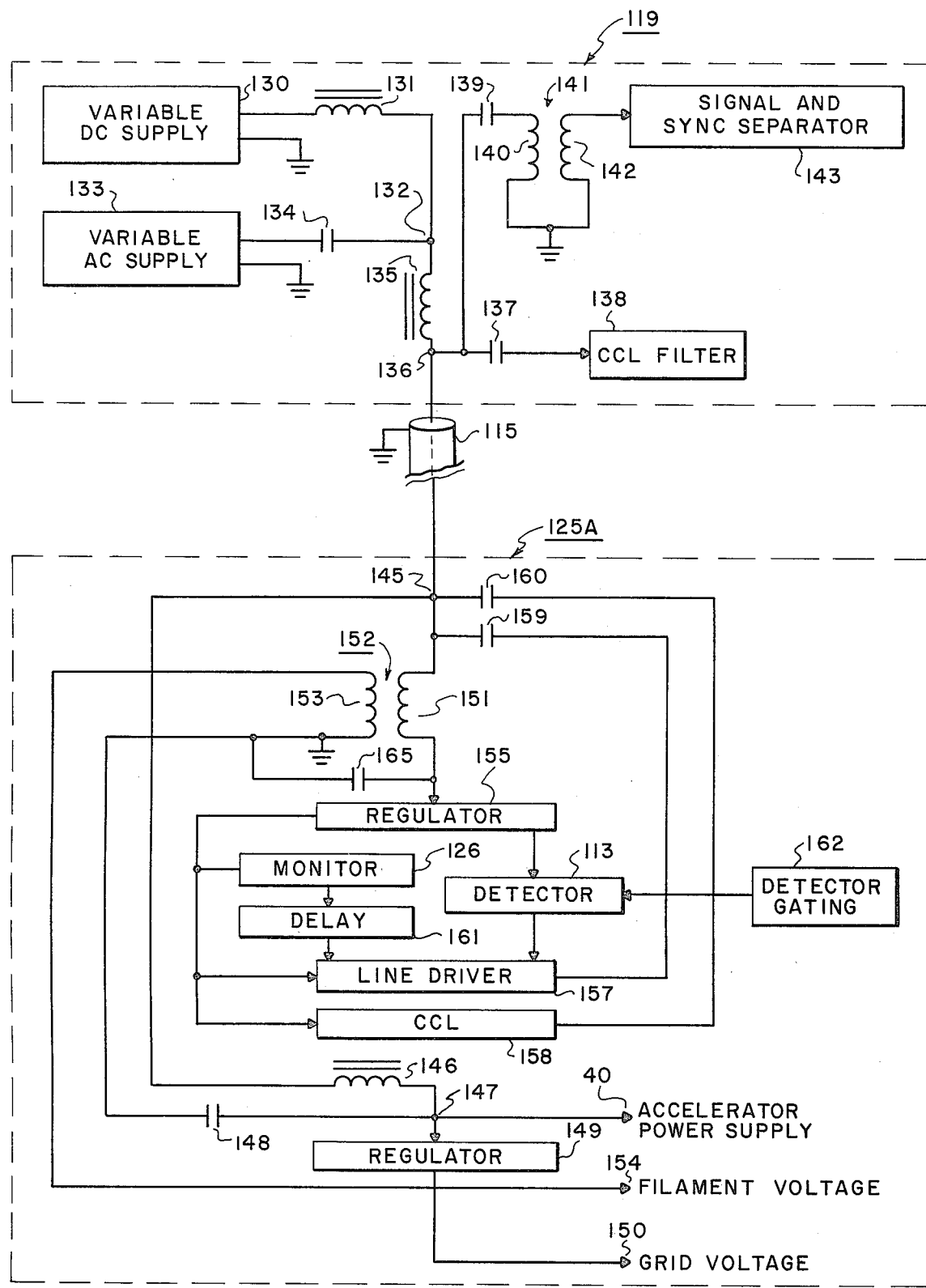
FIG. 2 is a schematic illustration, partly in block diagram, of a portion of the surface and subsurface circuitry according to the present invention.

A subsurface electronics section 125, shown in more detail in FIGS. 2, 3 and 4, is also located within the borehole instrument 112.

Referring now to FIG. 2, there is illustrated in greater detail the surface electronics 119 and a portion 125A of the subsurface electronics circuitry 125. Within the surface electronics 119, a variable D.C. power supply 130 is connected through a choke 131 to a junction 132, one side of the output of the power supply 130 being grounded. A variable A.C. power supply 133 is connected through capacitor 134 to junction 132, the other side of the output of the A. C. power supply 133 being grounded. The junction 132 is connected through a choke 135 to a junction 136. The junction 136 is electrically connected to the single conductor within the cable 115, the outer sheath of the cable 115 being grounded. The junction 136 is also connected through capacitor 137 to a conventional casing collar locator filter circuit 138 which can be built, for example, in accordance with the disclosure of U.S. Patent Application Ser. No. 768,216, for CASING COLLAR LOCATOR, filed Oct. 14, 1968, now abandoned. The terminal 136 is also connected through capacitor 139 to the primary 140 of transformer 141. The secondary winding 142 of transformer 141 is connected into a conventional signal and sync separator circuit 143 which can be built in accordance with the disclosure of U.S. Pat. No. 3,358,142, for DETECTOR GATING SYSTEM EMPLOYED IN A PULSED NEUTRON LOGGING SYSTEM to Eric C. Hopkinson et al, and assigned to the assignee of the present invention.

Referring further to FIG. 2, the subsurface circuitry 125A has the single conductor of cable 115 connected to terminal 145 within the well logging instrument 112 (illustrated in FIG. 1). The junction 145 is connected through choke 146 to a junction 147 which is connected to ground through capacitor 148. A conventional voltage regulator circuit 149 is connected to junction 147, the output of the regulator circuit 149 being connected to terminal 150 bearing the legend "GRID VOLTAGE." The junction 147 is also connected to the junction 40 bearing the legend "ACCELERATOR POWER SUPPLY." The junction 145 is also connected to one side of the primary coil 151 of the transformer 152 whose secondary 153 has one side grounded and the other side connected to terminal 154 bearing the legend "FILAMENT VOLTAGE." The other side of the primary coil 151 is connected to a voltage regulator 155 whose output is connected to the monitor circuit 126, a conventional line driver circuit 157 and a casing collar locator circuit 158 which can be built in accordance with the foregoing patent application Ser. No. 768,216. The output of the line driver circuit 157 is connected through capacitor 159 to the junction 145. The output of the casing collar locator circuit 158 is connected through capacitor 160 to junction 145. A delay circuit 161 is connected between the monitor circuit 126 and the line driver circuit 157. The output of the regulator circuit 155 is also connected to the detector circuit 113 whose output is connected to the line driver circuit 157. The detector circuitry 113 is gated by a detector gating circuit 162 in accordance with the teachings of the foregoing Hopkinson et al. U.S. Pat. No. 3,358,142.

Before examining the operation of the circuit of FIG. 2, it should be appreciated that the pulsed neutron well logging systems of the prior art have been ideally accomplished with a multiconductor logging cable which facilitates independent control over the various downhole functions. Furthermore, there are two important control parameters, these being (1) the neutron source filament current, and (2) the accelerating voltage which controls the neutron output. In summary, the following functions are generally considered either necessary or highly desirable in making such a pulsed neutron logging operation:

1. independent control of the neutron source filament;
2. control of the accelerating voltage over a fairly wide range;
3. the sync pulse and signal transmission;
4. an indication of the neutron source output;
5. the casing collar locator signal.

The circuitry of FIG. 2 provides a means for fulfilling each of the above-noted requirements. A D.C. voltage is supplied from the variable D.C. supply source 130 to energize the fixed D.C. loads within the subsurface instrument. These are maintained constant by means of the regulators 149 and 155 once a certain D.C. threshold from the variable D.C. supply 130 is reached. However, the D.C. supply 130 can be varied above this threshold to control the accelerator voltage and hence the neutron output. An A.C. voltage from the variable A.C. supply circuit 133 is applied to the cable 115 by means of the coupling capacitor 134. The A.C. power is terminated at the 1:1 turns ratio transformer 152 within the subsurface instrument and essentially all of the A.C. voltage appears across the primary 151 of the transformer 152 by virtue of the large capacitor 165 connected to ground, thus providing power for the neutron source filament from the secondary winding 153 to the junction 154.

The A. C. current supplied by the A.C. power supply 133 is the sum of the neutron source current (the filament current) and the shunt current feeding the logging cable capacitance. Since the shunt current can be determined, a visual indication and control of the filament current is provided. This of course is dependent upon the D.C. current through the primary coil 151 being small enough that the core of the transformer 152 is not saturated to cause a loss of the primary inductance.

The power of the ion accelerator is tapped off at terminal 145. This point in the circuit is chosen to prevent excessive D.C. current from going through the primary of transformer 152 and is a combination of A.C. and D.C. The A.C. is reduced to a very low level at junction 147 by means of the choke 146 and the capacitor 148 to ground, thus leaving D.C. power at the junction 147 to energize the accelerator and auxiliary circuits such as the regulator circuit 149.

The output of the line driver circuit 157, having the source monitor signal and the detected pulses as received by the detector 113 thereon, is coupled through the capacitor 159 to the junction 145. The output of the casing collar locator circuit 158 is also coupled to the point 145 through the capacitor 160. Thus, the casing collar locator signal, the monitor signal indicative of the source strength and the logging pulse train from the detector 113 are coupled to the single conductor cable at junction 145 for transmission to the earth's surface.

At the earth's surface, the transformer 141 is selected to filter out the A.C. power frequency (from the A.C. supply 133) and also the casing collar locator signal, leaving only the sync pulse and the received signal pulse train to be separated and processed by the signal and sync separator circuit 143. In a similar manner, the casing collar locator circuit 138 is selected to pass only the casing collar locator carrier frequency to the exclusion of the A.C. power frequency and the pulses which are passed to the signal and sync separator circuit 143.

The detector gating circuit 162 provides a gating of the detector 113 within the subsurface instrument such that the received pulse train starts at an appropriate interval after the neutron burst from the source 114 (illustrated in FIG. 1). For example, in the preferred embodiment there is a time interval between the sync pulse and the start of the purse train of about 100 microseconds. By introducing an appropriate delay in the delay circuit 161, for example, 50 microseconds, the monitor signal is delayed and gated in such a manner as to insert the monitor signal in the time interval between the sync pulse and the start of the received pulse train. In the surface instrumentation, the monitor signal is retrieved and recorded in the usual monitor track of the recorder 120.

Referring now to FIG. 3, there is illustrated a D.C. pulse source 10, the outputs 43 and 58 of the source 10 being connected to the primary 13 of the transformer 14. The secondary 15 of the transformer 14 is connected into a voltage multiplier circuit. The top section of the secondary of the transformer is connected to the junction A, the junction A being connected to junction C by means of the capacitor 16. The lower segment of the secondary 15 of the transformer is connected to junction B which is grounded. The anode of diode 17 is connected to junction B and the cathode of diode 17 is connected to junction C. Junctions B and D are connected together by means of capacitor 18. The anode of diode 19 is connected to junction C whereas the cathode of diode 19 is connected to junction D. Junctions C and J are connected together by means of capacitor 20. The anode of diode 21 is connected to junction D whereas the cathode of diode 21 is connected to junction J. The same type of connection of diodes and capacitors is carried out until a desired number of stages are connected together, the last stage being illustrated as having a capacitor 22 being connected to the junction F. The anode of diode 23 is connected to junction G whereas the cathode of diode 23 is connected to junction F also. The junction G is connected to junction H by means of capacitor 24. The anode of diode 25 is connected to junction F whereas the cathode of diode 25 is connected to junction H. The junction F is connected through resistor 26 to the cathode 27 of an ion source 28. The anode 29 of the ion source 28 is connected to junction H. The cathode 27 is illustrated as having a certain amount of inter-electrode capacitance 30 between the cathode 27 and the grounded target 70. It should be appreciated that such ion sources are known in the art for use with accelerator tubes useful in producing high energy neutrons, especially from the D-T reaction, and which are especially useful in radioactivity well logging. Examples of such prior art are shown in U.S. Pat. No. 3,309,522 to A. H. Youmans, et al., issued Mar. 14, 1967, and U.S. Pat. No. 2,689,918 to A. H. Youmans, issued Sept. 21, 1954, each of which is assigned to the assignee of the present application.

In the operation of the circuit of FIG. 3, aside from considerations of its use with the ion source 28, it should be appreciated that the voltage E appearing across the capacitor 16 is approximately equal in amplitude to the voltage appearing between points A and B on the transformer secondary. The voltage appearing across capacitor 18 is equal to 2E. The voltage appearing across capacitor 20 is equal to 3E. Further out in the circuit, the voltage appearing across the capacitor 22 is equal to $(2N-1)E$ and the voltage appearing across the capacitor 24 is equal to 2NE, assuming no current supplied from the multiplier to the load, where E is the peak value of the input voltage, N is the number of stages and where two capacitors and two diodes comprise one stage.

If the multiplier is supplying current to a load, then the input voltage will be:

$$V = 2NE - \frac{I}{fc}\left(\frac{2N^3}{3} + \frac{N^2}{2} - \frac{N}{6}\right)$$
$$= 2NE - \Delta V$$

where $f$ is the frequency of the input voltage, $I$ is the load current, and $c$ is the capacitance of one of the capacitors 16, 18, 20, etc.

As the load current increases, the ripple voltage at the output will increase and will be determined by the expression $$\delta V = \frac{I}{fc} N \frac{(N+1)}{2}$$

so that the total voltage varies between the values
$V$ max $= 2NE - \Delta V$ and
$V$ min $= 2NE - \Delta V - \delta V$.

If the multiplier is energized from a source of high voltage pulses instead of an A.C. sine wave, then the output voltage will be composed of a D.C. component plus a pulsed component.

Referring further to FIG. 3, the highest potential of the voltage multiplier, appearing at junction H, is connected to the anode 29 of the accelerator tube, the cathode of the ion source being connected one-half stage further down through the resistor 26 to the junction F. The grid voltage and the filament voltage, from terminals 150 and 154, respectively, are connected to the grid and filament (not illustrated) of the accelerator tube. By having enough stages, there is sufficient voltage developed across the diode 25 and of the correct polarity to ignite the ion source and produce positive ions within the accelerator tube. The remaining voltage between the ion source cathode 27 and ground is the acceleration voltage.

With no load on the circuit, a nearly constant, D.C. voltage appears between the junctions F and H. As the multiplier begins to supply current to the accelerator tube, the ripple will begin to increase and will appear, along with the D.C. component, at the ion source anode and cathode. If a resistance 26 is inserted between junction F and the ion source cathode 27, the resistance in combination with the cathode capacitance to ground tends to integrate or filter the ripple portion pulses at the ion source cathode, leaving an excess of ripple at the anode.

By selecting the resistance 26 and value of capacitance for the multiplier consistent with the current requirements of the accelerator tube, a condition is attained whereby the ion source dumps its charge during the ripple pulse and extinguishes itself after the pulse has passed, thereby producing a burst of neutrons at a rate determined by the driving frequency. Although the resistor 26 will obviously have to be matched to the interelectrode capacitance 30 for a given accelerator tube, and the various capacitances within the multiplier circuit, its value is normally quite high, for example, 20 megohms.

In the preferred embodiment of the present invention, the pulses applied to the transformer 14 have a repetition rate of approximately 1,000 pulses per second. The voltage multiplier circuit has twelve stages, wherein two capacitors and two diodes comprise one stage. The capacitors used in the multiplier string are 0.001 microfarad. However, it should be appreciated that higher capacitance values can be used where space permits to reduce the required number of stages. The diodes used in the multiplier string are designed to withstand the reverse peak-to-peak value of the driving voltage and have a low reverse leakage at elevated temperature. The value of the interelectrode capacitance 30 between the cathode 27 and the grounded target 70 is nominally about 20 pf. By using a 20 megohm resistor 26, an RC time constant of 400 microseconds is achieved which is sufficient to allow pulsing at a suitable neutron output. Since there is no corona load, the current supplied by the power supply must flow through the ion source and hence no current is wasted. In an alternative embodiment, I have found that adequate pulsing of an ion tube can be accomplished using ten stages in the voltage multiplier circuit; six stages using 0.0018 microfarad capacitors and four stages using 0.0012 capacitors. With such a circuit and using a resistor 26 of 100 megohms in conjunction with an ion tube having an interelectrode capacitance of approximately 20 picofarads, the ion source produced neutrons at 1,000 pulses per second in harmony with the pulse repetition rate of pulses applied to the transformer 14.

Figure 5:
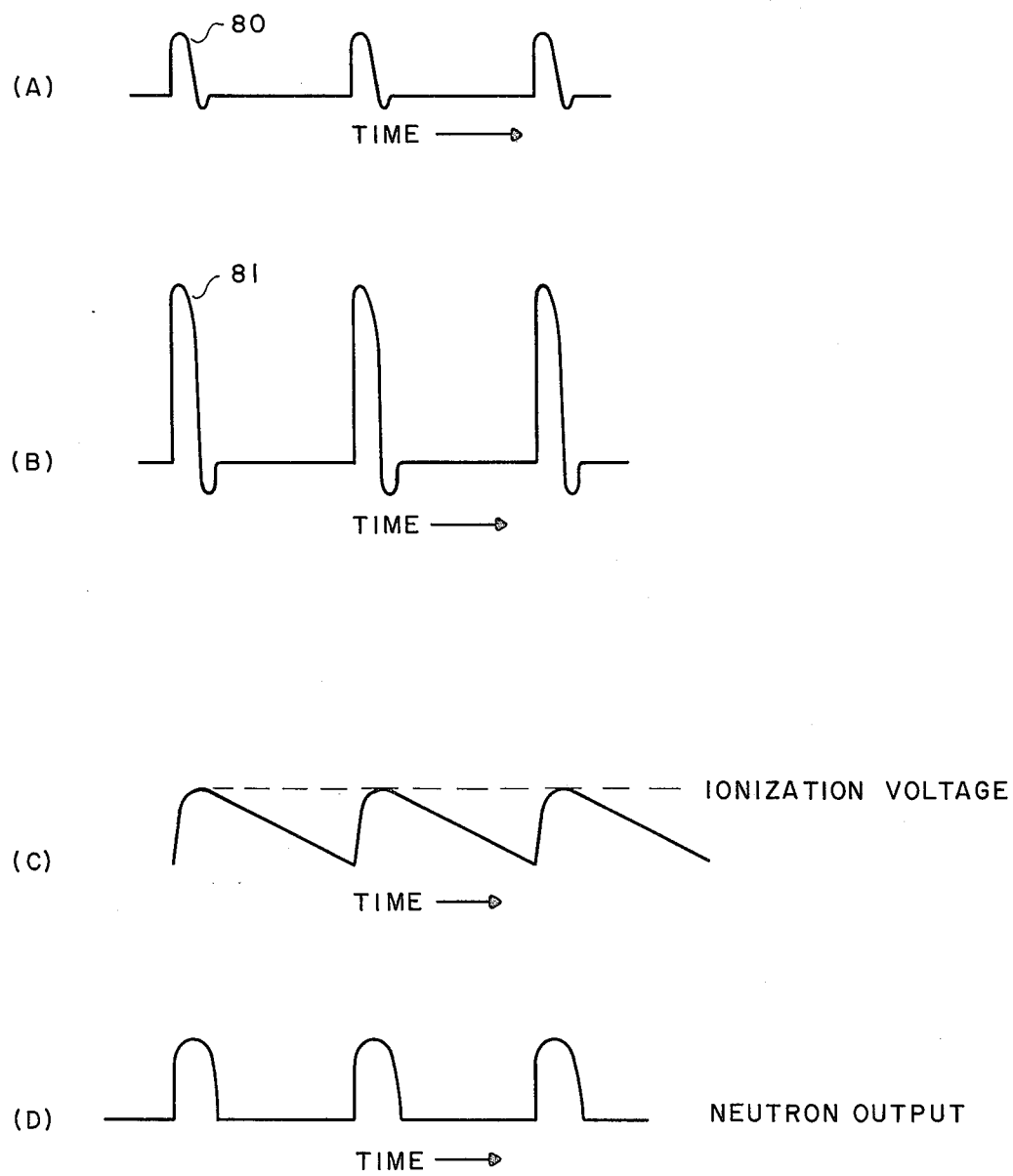
FIG. 5 illustrates wave forms at various points within the system and circuitry according to the preceding figures.

Referring now to FIG. 5, representative wave forms within the voltage multiplier circuit are provided whereby a better understanding of the operation of the circuitry of FIG. 3 is provided. Since there is a voltage difference between points F and H, current attempts to flow from the ion source 29 to the cathode 27, and when ionization occurs within the tube 28, current flows from the anode 29 to the grounded target 70 to produce neutrons. As current begins to flow, charge will leave the capacitors within the voltage multiplier string and the voltages across the capacitors will fall until some equilibrium final voltage is reached because of the driving pulses applied to the transformer 14 which recharges the capacitors. The voltage between the points F and H is sufficient to cause ionization of the ion source 28 which causes current to flow between the anode 29 and the cathode 27. However, during the positive swing of the driving pulse, the pulse current will take the path through the diode 25 due to the impeding action of the resistor 26 and the interelectrode capacitance 30. Because the ion source 28 is essentially a constant voltage device, the voltage across the ion source tends to remain constant, and a current pulse will flow across the ion source. This increases the charge on capacitor 30 and thus raises the voltage on capacitor 30. After the pulse, the cathode 27 is at a voltage higher than it was before the pulse and hence the ion source voltage lower than the ionization voltage. The cathode voltage thus has to restore itself to its original value through the resistor 26 and the capacitor 30.

FIG. 5 illustrates the wave forms appearing in the voltage multiplier circuit and at the ionization tube 28. In FIG. 5A, the voltage pulse 80 is typical of the voltage swing at point A in FIG. 3. In FIG. 5B, the voltage pulse 81 is typical of the wave form appearing at point F in FIG. 3 and is somewhat like the pulse appearing in FIG. 5A except for being vastly increased in amplitude. FIG. 5C illustrates the wave form appearing at point H in FIG. 3. It should be appreciated that when the point H reaches the ionization voltage, the voltage at point H starts to decrease as a ramp function dependent upon the values of the resistor 26 and the interelectrode capacitance 30. In the operation of the circuitry according to the present invention, each time the ionization voltage is reached, the ion source produces neutrons as shown in FIG. 5D. It should be appreciated that the "ionization voltage" referred to herein relates to the voltage difference between the anode and cathode of the ion tube. By way of example, the ionization voltage may be approximately 300 volts, whereas both the anode 29 and cathode 27 are maintained in the tens or hundreds of thousands (volts) above the grounded target 70.

Although the theory of operation of the resistor 26 in the circuit is not completely understood, it is believed that it acts to retard the pulsing of the cathode 27 while the anode 29 is allowed to pulse, thus creating the voltage difference (the ionization voltage) therebetween. Furthermore, if the resistor 26 is too large, for example, is "open" or infinitely high, the ionization voltage will not be reached. Conversely, if the resistor 26 is too small, the ionization point is either reached too soon (fires early) or not at all.

Referring now to FIG. 4, the D.C. pulse source 10 illustrated in block diagram in FIG. 3 is shown in greater detail. The terminal 40, for example, having a voltage of 150 VDC thereon, is connected by conductor 42 to junction 43. The junction 43 is connected through resistor 44 to junction 45. A diode 46 is connected between the junction 45 and ground. Also connected between the junction 45 and ground is a unijunction transistor, relaxation oscillator, comprised first of a series combination of resistor 47 and capacitor 48, the junction of the resistor and the capacitor being connected to the emitter 49 of the unijunction transistor 50. The B1 base 51 of the transistor 50 is connected by means of resistor 52 to ground. The B2 base 53 of the transistor 50 is connected to junction 45 by means of resistor 54. The B1 base 51 is connected by capacitor 55 to the gate 56 of the SCR 57. The anode of the SCR 57 is connected to junction 58, which in turn is connected through capacitor 59 to the primary 60 of transformer 61, the other end of which is connected to ground. The secondary coil 62 of the transformer 61 is connected between ground and the base of transistor 63 whose emitter is grounded. The cathode of the SCR 57 is connected to the collector of transistor 63, the collector of transistor 63 also being connected to ground through capacitor 64. The junction 58 and junction 43 are connected to opposite ends of primary 13 of the transformer 14. The junction 43 is also connected to ground by means of capacitor 65.

It should be appreciated that the unijunction transistor relaxation oscillator is known in the art, for example, as shown on page 46 of the Silicon Control Rectifier Manual, Second Edition, published by the Rectifier Components Department of General Electric Company, Auburn, New York in 1961. It should furthermore be appreciated that the components used in FIGS. 3 and 4 herein are not especially critical as to value. However, it has been found preferable that when using a 2N1777 for the SCR 57 and a MJ3011 power transistor available from a Motorola Semiconductor Company of Phoenix, Arizona for the transistor 63 and a DC voltage at terminal 40 of 150 VDC, the capacitor 64 should preferably be at least 10 microfarads and even more preferably should be 14 microfarads.

In the operation of the circuit of FIG. 4, low voltage pulses from the unijunction transistor relaxation oscillator are coupled through the capacitor 55 to the gate of the SCR 57. With such an arrangement, pulses would normally be produced in the step-up transformer 14 of considerably higher voltage, for example at junction 58, than are coupled into the gate of the SCR 57. It should be appreciated, however, that since SCR's are susceptible to latching up, i.e., going out of control into a conduction mode which is not controllable by the gate, that after one or more pulses are coupled into the gate of the SCR 57, in the event the SCR does latch up, the pulse nature of the overall circuit is lost and no additional pulses will be coupled from the transformer primary 13 to the secondary 15.

With the circuit according to the present invention, a portion of the high voltage pulses are connected back from junction 58 through the capacitor 59 to the primary winding 60 of the transformer 61. This causes the pulses to be transformer coupled into the secondary winding 62 which is connected to the base of the transistor 63. This drives the transistor 63 into saturation and thus provides a lowering of the impedance between the cathode of the SCR 57 and ground. In the event the SCR should attempt to latch up, the SCR no longer produces pulses, thereby removing the drive from the base of the transistor 63, thus leaving the transistor 63 in a non-conducting or high impedance state. The SCR will then recover to its non-conducting state. There is sufficient impedance on the SCR cathode that it will try to turn on again from the gate drive from the capacitor 55 whereby a pulse will be produced at the junction 58 to again drive the transistor 63 into conduction and the circuit to begin to operate in its normal pulsed mode.

It should be appreciated that with such an overall circuit of FIGS. 3 and 4, there is generated high voltage pulses of between 15 and 20 KVDC at terminals A and B connected to the transformer secondary 15 and between 80 and 120 KVDC on the junction H which is connected to the anode 29 of the ion source 28.

While the preferred embodiment of the circuitry according to the present invention has been described and illustrated herein, various modifications will be apparent to those skilled in the art from a careful reading of the aforementioned embodiments. For example, instead of the transistor 63 being used as the variable impedance device in the cathode circuit of the SCR 57, one could if desired use other variable impedance devices, for example, a field effect transistor or another SCR or some other such gated device. Likewise, those skilled in the art will recognize that other types of impedance means, for example, diodes, transistors and the like can be used in conjunction with, or instead of the resistor 26 between the junction F and the cathode 27 in FIG. 3 to thus enable the anode to be raised to a proportionately higher voltage than the cathode and thereby produce the necessary ionization voltage therebetween.

The embodiments of the invention in which an exclusive property or privilege is claimed are defined as follows:

1. In a circuit for pulsing an ion source in an accelerator tube having an anode and a cathode, the improvement comprising:
    a voltage multiplier circuit having one output at a first voltage potential and a second output at a second voltage potential, said second output being connected to the anode of said accelerator tube; and
    a resistor connected between said first output and the cathode of said accelerator tube.

2. In a circuit for pulsing an ion source in an accelerator tube having an anode and a cathode, the improvement comprising:
    a voltage multiplier circuit having one output at a first voltage potential and a second output at a second voltage potential, said second output being connected to the anode of said accelerator tube; and
    impedance means connected between said first output and the cathode of said accelerator tube.

3. The circuit according to claim 2, being further characterized as including means for pulsing the input of said voltage multiplier circuit.

4. The circuit according to claim 2, being further characterized as including a diode connected between said first and second outputs of said voltage multiplier circuit.

5. A radioactivity well logging apparatus, comprising:
    a source of D.C. voltage;
    means to pulse said D.C. voltage to provide D.C. voltage pulses having a given repetition rate;
    a voltage multiplier circuit connected to, and pulsed by, said D.C. voltage pulses, said circuit having first and second outputs;
    an ion source accelerator tube, for producing high energy neutrons having a cathode and an anode therein, said anode being connected to said second output of said voltage multiplier circuit; and
    impedance means connected between said first output and said cathode.

6. A radioactivity well logging apparatus, comprising:
    a source of D.C. voltage pulses having a given repetition rate;

a voltage multiplier circuit connected to, and pulsed by, said D.C. voltage pulses, said circuit having first and second outputs;

an ion source accelerator tube, for producing high energy neutrons having a cathode and an anode therein, said anode being connected to said second output of said voltage multiplier circuit; and impedance means connected between said first output and said cathode.

7. The apparatus according to claim 6 wherein said impedance means comprises a resistor.

8. In a circuit for pulsing an ion source accelerator tube having an anode and a cathode with a pulsed D.C. voltage having a given pulse repetition rate delivered from first and second output terminals, the improvement comprising impedance means and the connection of the first of said output terminals to said cathode through said impedance means and the connection of the second of said output terminals to said anode.

9. The circuit according to claim 8 wherein said impedance means comprises a resistor.

* * * * *